Oct. 19, 1937.  A. A. ARVINTZ  2,096,444
FILLING CAP AND STRAINER DEVICE
Filed Dec. 19, 1934
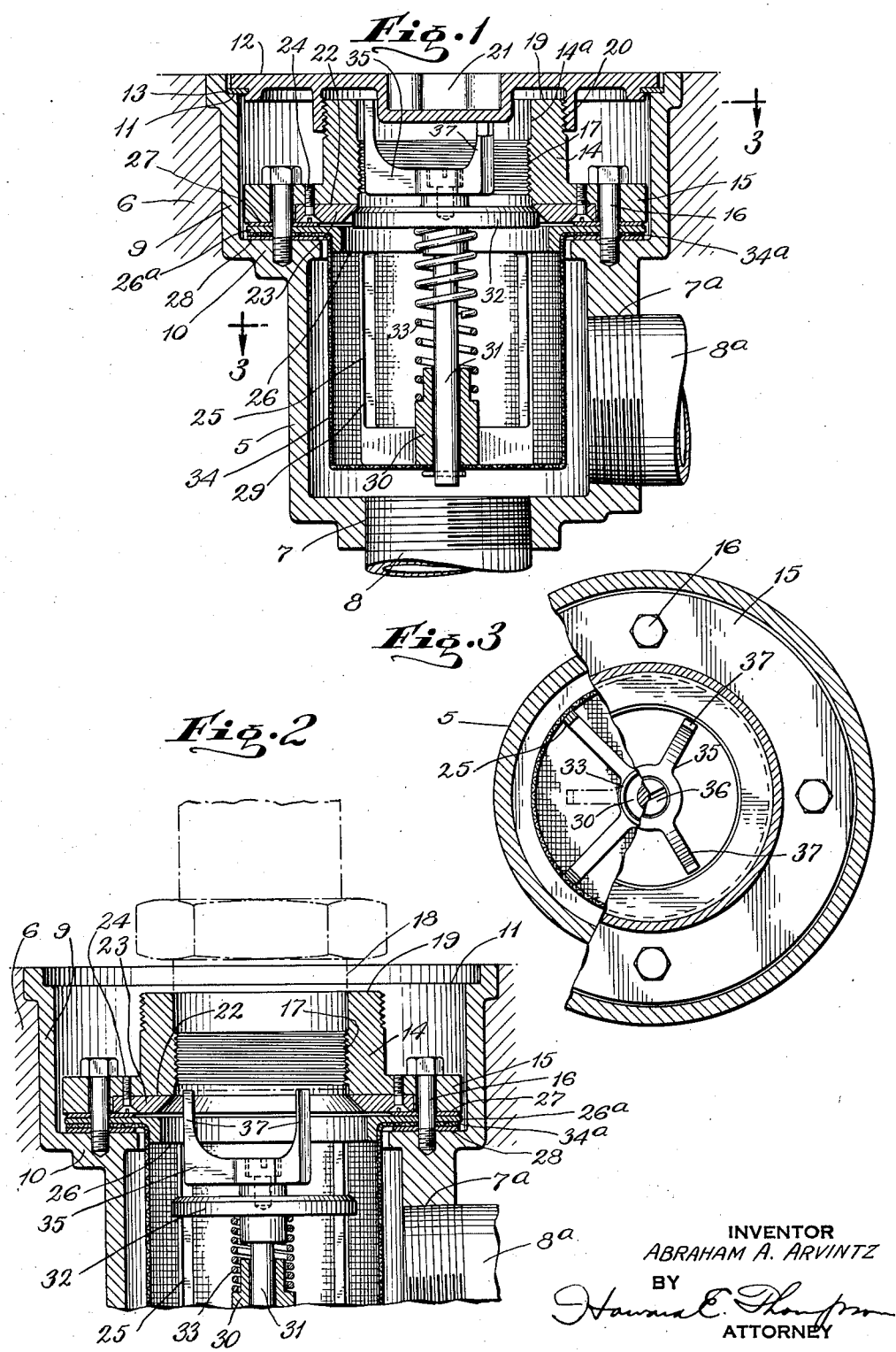
INVENTOR
ABRAHAM A. ARVINTZ
BY
ATTORNEY Patented Oct. 19, 1937

2,096,444

UNITED STATES PATENT OFFICE 2,096,444

FILLING CAP AND STRAINER DEVICE

Abraham A. Arvintz, Brooklyn, N. Y., assignor to Seal-O-Strain Corporation, Brooklyn, N. Y., a corporation of New York Application December 19, 1934, Serial No. 758,168

9 Claims. (Cl. 284—14)

This invention relates to devices controlling admission of various types of fluids into tanks, such for example as a filling and strainer device for gas and oil tanks; and the object of the invention is to provide a device of the class described with an automatically seating valve with means on the valve facilitating the movement thereof into open position upon the insertion of a pipe or tube into the device in the operation of transmitting fluid therethrough; a further object being to provide means for detachably mounting a valve seat within the device to facilitate the use of the desired material therein and also for the purpose of cleaning or replacing the same whenever desired; a further object being to provide means for guiding the valve in its movement in the device and also for supporting a strainer body into and through which the fluid passed through the device is adapted to pass; a still further object being to provide a closure cap for the device controlling admission to the valve and passage controlled by the valve, the cap having a countersunk tool receiving socket by means of which said cap may be coupled and uncoupled; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a longitudinal, sectional view through the device made according to my invention with the parts in closed position.

Fig. 2 is a view similar to Fig. 1 showing the closure cap removed and illustrating the valve of the device in open position; and, Fig. 3 is a broken cross section on the line 3—3 of Fig. 1.

The filling and strainer device forming the subject matter of this invention is an improvement on that disclosed in my prior application, Serial Number 717,037, filed March 23, 1934. In carrying my invention into effect, I employ a casing 5 which may be countersunk in a suitable supporting surface 6, it being understood in this connection that the casing 5 may be arranged directly upon or mounted in connection with a tank or other support; but where the casing 5 is disposed in spaced relation to a tank, the casing will be provided with threaded outlet ports 7, 7a for receiving discharge pipes 8, 8a, either one or both of which can be employed, or a plug may be substituted for one of the pipes, depending entirely upon the particular installation to be made.

The upper end 9 of the casing is enlarged to form a seat 10 and the upper edge of the enlargement 9 is grooved to form a seat 11 for a closure cap 12. A gasket 13 is preferably disposed between the cap 12 and seat 11. Arranged within the enlargement 9 is an admission tube 14 having a wide base flange 15 coupled with the seated portion 10 by bolts 16.

The tube 14 is internally threaded as seen at 17 to receive a pipe or coupling indicated in dot and dash lines at 18 in Fig. 2 of the drawing, in introducing fluid or other material into and through the device as later described. The tube 14 is externally threaded as seen at 19 to receive the internally threaded sleeve 20 on the cap 12 for coupling and uncoupling said cap. The cap is provided centrally with a countersunk socket portion 21 of any desired irregular contour to receive a suitable wrench, by means of which the cap may be opened and closed.

It will appear that the countersunk portion 21 extends into the tube 14, thus providing a smooth upper surface for the filling device or a surface level with the support 6. The lower surface of the tube 14 and the flange portion 15 thereof is recessed as seen at 22 to receive a valve seat ring 23 which may be held in place by screws 24. I also provide an openwork supporting frame 25 having a flanged ring 26 at the upper end thereof, the flange 26a of said ring being disposed between the flange 15 and seat 10, suitable packings 27 and 28 being employed.

The ring 26 is provided with four depending arms 29, the lower ends of which extend inwardly and radially and join a tubular valve stem guide 30, in which the stem 31 of a disk valve 32 is slidably mounted. The valve 32 has a beveled surface seating upon a corresponding beveled surface on the seat 23. A coil spring 33 seating on the guide 30 and lower surface of the valve 32 serves to normally support the valve in closed or seated position.

Arranged upon the frame 25 is a strainer body 34 substantially cup-shaped in form, and the upper end of which is flanged as seen at 34a to support said body upon the seat 10 in the manner clearly seen in the drawing. Rotatably mounted upon the upper surface of the valve 32 is an openwork member 35 held in place by a headed screw 36 around which said member is free to rotate, the member having three radially or upwardly directed arms 37, the upper ends of which terminate at the upper end of the tube 14 when the valve 32 is in closed position. In this connection, it will be noted that the bore 14a of the tube is slightly enlarged above the threaded portion 17 to permit free passage of the pipe or coupling 18 into said tube and to facilitate the threading engagement. In this operation it will be understood that the end of the pipe coupling 18 will strike the arms 37 and serve to depress the valve 32 to move the same into the position shown in Fig. 2 of the drawing, in which position it will appear that a wide opening of the valve is provided which will permit free flow of the fluid into the filling device and through the strainer body and thus into a tank or other receiver, either directly or through one or more pipes 8, 8a, employed for this purpose. It will appear that as the coupling 18 is screwed into the tube 14, the member 35 is free to rotate with the coupling, thus relieving any rotary stress or strain on the valve 32, and will eliminate excessive wear of the stem of the valve. The manner of mounting the member 35 also centralizes the pressure on the axis of the valves 32, as will be apparent.

By employing the ring member 23 as a valve seat, it will be understood that the same may be composed of the desired material best suited as to hardness or other characteristics for the intended purpose, whereas the remainder of the tube 14, including its flange, may be made from any other less expensive material which will materially reduce the cost of the complete device in this respect. At the same time, it will appear that should the seat of the ring 23 become worn or otherwise rendered useless, the same can be replaced without replacing the remainder of the structure. Upon removal of the cap 12, the entire unit may be removed from the casing 5 by the removal of the bolts 16, for the purpose of cleaning, repairing or replacing the strainer body 34 or for any other purpose.

Having fully described my invention, what I claim as new and desire to secure by Letters Patent, is:

1. A device of the class described comprising a casing, one end of which is enlarged to form an annular seat, a flanged tube mounted in the enlarged portion of said casing, means passed through the flange thereof for securing the same to said seat, an openwork frame arranged in the lower portion of the casing and supported in connection with said seat, a valve movably mounted in connection with said frame and guided thereby, a detachable ring mounted in connection with the lower surface of the flanged tube and forming a seat in connection with which the valve operates to control communication between said tube and the lower portion of said casing, said tube opening through the upper end of the casing, a cap detachable with said tube and controlling admission thereto, tensional means for normally holding the valve in closed position and the lower portion of the casing having discharge passages in the bottom and side walls thereof.

2. A device of the class described comprising a casing, one end of which is enlarged to form an annular seat, a flanged tube mounted in the enlarged portion of said casing, means passed through the flange thereof for securing the same to said seat, an openwork frame arranged in the lower portion of the casing and supported in connection with said seat, a valve movably mounted in connection with said frame and guided thereby, a detachable ring mounted in connection with the lower surface of the flanged tube and forming a seat in connection with which the valve operates to control communication between said tube and the lower portion of said casing, said tube opening through the upper end of the casing, a cap detachable with said tube and controlling admission thereto, the lower portion of the casing having a discharge passage, and tensional means supported in said openwork frame and cooperating with the valve for normally retaining the same in closed or seated position.

3. A device of the class described comprising a casing, one end of which is enlarged to form an annular seat, a flanged tube mounted in the enlarged portion of said casing, means passed through the flange thereof for securing the same to said seat, an openwork frame arranged in the lower portion of the casing and supported in connection with said seat, a valve movably mounted in connection with said frame and guided thereby, a detachable ring mounted in connection with the lower surface of the flanged tube and forming a seat in connection with which the valve operates to control communication between said tube and the lower portion of said casing, said tube opening through the upper end of the casing, a cap detachable with said tube and controlling admission thereto, the lower portion of the casing having a discharge passage, tensional means supported in said openwork frame and cooperating with the valve for normally retaining the same in closed or seated position, means movably supported in connection with the upper surface of said valve and extending into said tube for moving the valve into open position upon the insertion of a fluid discharge member into said tube and for supporting the valve in open position when the fluid discharge member is disposed within said tube, and said last named means comprising a part rotatably supported on the valve and including a plurality of radially and outwardly extending arms.

4. A filling device of the class described comprising a hollow casing, the upper end portion of which is enlarged and opening outwardly through the top thereof, the lower portion of the casing having a discharge passage, the enlarged upper portion of the casing joining said lower portion in an annular seat, a flanged tube arranged within the enlarged portion of the casing with the flange thereof extending outwardly over said seat and with the upper end of the tube opening outwardly through the upper end of the casing and disposed on said end of the casing, a valve, means for supporting and guiding said valve in said casing, said flanged tube having at the lower portion thereof a beveled seat in connection with which the valve operates to close communication between the bore of said tube and the lower portion of the casing, a closure cap in threaded engagement with said tube and seating on the upper edge portion of the enlarged part of the casing to form a closure for said casing and tube, the upper surface of the cap being in alinement with the upper edge of said casing, and a tool receiving socket formed in the cap to facilitate attachment and detachment thereof.

5. A filling device of the class described comprising a hollow casing, the upper end portion of which is enlarged and opening outwardly through the top thereof, the lower portion of the casing having a discharge passage, the enlarged upper portion of the casing joining said lower portion in an annular seat, a flanged tube arranged within the enlarged portion of the casing with the flange thereof extending outwardly over said seat and with the upper end of the tube opening outwardly through the upper end of the casing and disposed on said end of the casing, a valve, means for supporting and guiding said valve in said casing, said flanged tube having at the lower portion thereof a beveled seat in connection with which the valve operates to close communication between the bore of said tube and the lower portion of the casing, means in the bore of said tube for detachably coupling a fluid admission member therewith, and a plurality of radially and upwardly extending arms on said valve extending into the bore of said tube and in connection with which the fluid admission member operates in the operation of coupling said member with said tube to move said valve into open position.

6. A filling device of the class described comprising a hollow casing, the upper end portion of which is enlarged and opening outwardly through the top thereof, the lower portion of the casing having a discharge passage, the enlarged upper portion of the casing joining said lower portion in an annular seat, a flanged tube arranged within the enlarged portion of the casing with the flange thereof extending outwardly over said seat and with the upper end of the tube opening outwardly through the upper end of the casing and disposed on said end of the casing, a valve, means for supporting and guiding said valve in said casing, said flanged tube having at the lower portion thereof a beveled seat in connection with which the valve operates to close communication between the bore of said tube and the lower portion of the casing, means in the bore of said tube for detachably coupling a fluid admission member therewith, a plurality of radially and upwardly extending arms on said valve extending into the bore of said tube and in connection with which the fluid admission member operates in the operation of coupling said member with said tube to move said valve into open position, and means for rotatably supporting the arms in connection with said valve.

7. A unit of the class described comprising a tube, an openwork frame arranged and projecting from one end of the tube, a valve seat at the lower surface of the tube, a disk-shaped valve adapted to be supported on said seat to control communication between the tube and said frame, the valve having a long stem mounted centrally of the frame and guided in its movement thereby, tensional means arranged upon the stem of the valve for holding the same in seated or closed position, means for coupling a fluid admission element with said tube, and means disposed in the tube and movable relatively to said valve for moving the valve into open position in the operation of coupling said element with said tube.

8. A unit of the class described comprising a tube, an openwork frame arranged and projecting from one end of the tube, a valve seat at the lower surface of the tube, a disk-shaped valve adapted to be supported on said seat to control communication between the tube and said frame, the valve having a long stem mounted centrally of the frame and guided in its movement thereby, tensional means arranged upon the stem of the valve for holding the same in seated or closed position, means for coupling a fluid admission element with said tube, means disposed in the tube and movable relatively to said valve for moving the valve into open position in the operation of coupling said element with said tube, a casing in which said unit is supported, and means for detachably coupling the unit with said casing.

9. A unit of the class described comprising a tube, an openwork frame arranged and projecting from one end of the tube, a valve seat at the lower surface of the tube, a disk-shaped valve adapted to be supported on said seat to control communication between the tube and said frame, the valve having a long stem mounted centrally of the frame and guided in its movement thereby, tensional means arranged upon the stem of the valve for holding the same in seated or closed position, means for coupling a fluid admission element with said tube, means disposed in the tube and movable relatively to said valve for moving the valve into open position in the operation of coupling said element with said tube, a casing in which said unit is supported and means for detachably coupling the unit with said casing, and a closure plate for the open end of said tube.

ABRAHAM A. ARVINTZ.